United States Patent [19]

Woodbrey

[11] Patent Number: 4,501,861
[45] Date of Patent: * Feb. 26, 1985

[54] THERMOPLASTIC POLYAMIDE COMPOSITIONS

[75] Inventor: James C. Woodbrey, Chesterfield, Mo.

[73] Assignee: Monsanto Company, St. Louis, Mo.

[*] Notice: The portion of the term of this patent subsequent to Aug. 24, 1999 has been disclaimed.

[21] Appl. No.: 462,248

[22] Filed: Jan. 31, 1983

Related U.S. Application Data

[63] Continuation-in-part of Ser. No. 437,990, Nov. 1, 1982, abandoned.

[51] Int. Cl.³ ............................................. C08L 77/00
[52] U.S. Cl. ..................................... 525/421; 525/408; 525/411; 525/431; 525/432; 525/415
[58] Field of Search ................. 525/91, 408, 411, 415, 525/431, 432

[56] References Cited

U.S. PATENT DOCUMENTS

| | | | |
|---|---|---|---|
| 3,549,724 | 12/1970 | Okazaki et al. | 525/430 |
| 3,636,135 | 1/1972 | Garforth et al. | 525/432 |
| 3,639,502 | 2/1972 | Okazaki et al. | 428/294 |
| 4,174,358 | 11/1979 | Epstein | 525/183 |
| 4,218,549 | 8/1980 | Jadamus et al. | 525/420 |
| 4,346,200 | 8/1982 | Woodbrey | 525/421 |

Primary Examiner—Melvyn I. Marquis
Assistant Examiner—A. L. Carrillo
Attorney, Agent, or Firm—Michael C. Schiffer; William J. Farrington; Paul D. Matukaitis

[57] ABSTRACT

Polyamide compositions comprising:
(a) poly(ε-caprolactam) resin of viscosity average molecular weight of at least about 15,000; and
(b) at least one block polymer having
  (i) from about 25 to about 80 weight percent poly(ε-caprolactam) segments of the formula

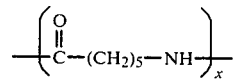

wherein x is an integer equal to 5 or more; and
  (ii) from about 75 to about 20 weight percent of segments having a number average molecular weight of at least 300 selected from the group consisting of segments of poly(propylene oxide), polycaprolactone, polytetrahydrofuran, polybutadiene, polyisoprene, polyisobutylene, poly($C_1$–$C_8$ alkylene acrylate), poly($C_1$–$C_4$ dialkylene siloxane), poly(ethylene-co-propylene), poly(ethylene-co-carbon monoxide), and combinations thereof; said (ii) segments being connected to an (i) polyamide segment through groups selected from amide, ester, urea, carbamate, and imide; provided that the composition contains from about 15 to about 85 weight percent of Component (a) and from about 85 to about 15 weight percent of Component (b).

35 Claims, No Drawings

THERMOPLASTIC POLYAMIDE COMPOSITIONS

BACKGROUND OF THE INVENTION

Related Cases

This application is a continuation-in-part application of U.S. Application Ser. No. 437,990 filed Nov. 1, 1982, now abandoned.

FIELD OF THE INVENTION

This invention relates to thermoplastic polyamide compositions, more particularly to thermoplastic compositions comprising poly(ε-caprolactam) and a block polymer containing poly(ε-caprolactam) segments and other polymeric segments.

DESCRIPTION OF THE PRIOR ART

Polyamides are commonly employed as engineering thermoplastics. The balance of properties comprising strength, stiffness, impact resistance, and dimensional stability makes polyamides especially attractive as replacements for metals in various structural applications, particularly in automotive applications because of the reduction in weight that can often be achieved.

Although unmodified thermoplastic polyamides have many uses as an engineering thermoplastic, considerable efforts in the prior art have been made toward achieving improved properties for polyamide engineering thermoplastics. Such efforts are typically directed at improving a particular property or at improving the combination of properties of the polyamide resin to make it more suitable for a particular application.

U.S. Pat. No. 4,174,358 issued Nov. 13, 1979, to B. N. Epstein is directed to thermoplastic polyamide compositions having improved ductility or toughness. The toughened thermoplastic compositions taught in Epstein contain 60 to 99% by weight of a polyamide matrix resin and 1 to 40% by weight of at least one other phase which contains another polymer dispersed as small particles within the polyamide matrix and having sites which adhere to the polyamide. The polymer modifier in the compositions taught by Epstein can be any of a wide variety of polymers provided that it meet certain requirements, e.g., that it have certain sites which adhere to the polyamide and that it meet a tensile modulus limitation of 1 to 20,000 psi.

Various other prior art concerned with improving the impact of polyamides is discussed in columns 1 and 2 of the Epstein patent.

In U.S. Pat. No. 4,218,549, issued Aug. 19, 1980 to H. Jadamus et al there are described compositions comprising a first component which is at least one polyamide and a second component described as at least one polyether ester amide. These compositions are said to exhibit improved flexibility and cold impact strength. The polyamide component is from omega-aminocarboxylic acids or lactams having at least 10 carbon atoms. The polyether ester amide component is prepared by hydrolytic polycondensation employing the aforementioned carboxylic acids or lactams, an alpha, omegadihydroxy(polytetrahydrofuran), and a dicarboxylic acid.

In U.S. Pat. No. 3,549,724, issued to K. Okazaki et al on Dec. 22, 1970 there are described shaped articles made from polymer blends comprising a polyamide and a polyether-polyamide block copolymer. The block copolymer is prepared by the polycondensation reaction of a polyamide producing monomer selected from lactams, omega-amino acids, and diamines combined with dicarboxylic acids, in the presence of a polyether having terminal groups selected from amino groups, organic acid salts of such amino groups, carboxyl groups, organic amine salts of such carboxyl groups, and mixtures thereof. The block copolymer is dispersed within the form of slender particles arranged with their longitudinal axis parallel in the direction of molecular orientation of the shaped article. This arrangement of the block copolymer particles provides the compositions with high and durable antistatic properties. The same K. Okazaki et al and others disclose an improvement in the teachings of the '724 patent to obtain compositions which are said to have even better antistatic properties in the U.S. Pat. No. 3,639,502 issued Feb. 1, 1972. Polyamide-based compositions taught therein similarly are blends of a polyamide and a polyether-polyamide block copolymer.

In U.S. Pat. No. 3,636,135, issued Jan. 18, 1972 to J. D. Garforth et al compositions said to be resistant to static electrification are disclosed which comprise an admixture of a synthetic linear polyamide and a polyether ester amide which is a condensation product of an aliphatic dicarboxylic acid, a hydroxypolyoxyalkylene compound, and certain amino acids, lactams, diamines, or combinations thereof; provided that less than 20 percent by weight of the repeat units in the polyamide segments of the polyether ester amides are identical to the repeat units of the polyamide.

The present invention relates to novel compositions comprising a blend of poly(ε-caprolactam) or nylon 6 resin and a particular block polymer having poly(ε-caprolactam) segments and polymer polyol segments. Preferably, the block polymer is provided with acyl lactam groups. The polyol segment comprises at least about 20 percent by weight of the block polymer. This invention provides useful engineering thermoplastic compositions. Improved properties over the polyamide resin alone, e.g., improved resistance to break upon impact as measured by the notched Izod test ASTM D-256-56, are obtainable with the compositions of the present invention.

SUMMARY OF THE INVENTION

According to the present invention, there is provided a polyamide composition comprising:

(a) poly(ε-caprolactam) resin of viscosity average molecular weight of at least about 15,000; and (b) at least one block polymer having (i) from about 25 to about 80 weight percent poly(ε-caprolactam) segments of the formula

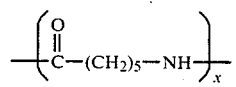

wherein x is an integer equal to 5 or more; and (ii) from about 75 to about 20 weight percent of polymer segments having a number average molecular weight of at least 300 selected from the group consisting of segments of poly(propylene oxide), polycaprolactone, polytetrahydrofuran, polybutadiene, polyisoprene, polyisobutylene, poly($C_1$-$C_8$ alkylene acrylate), poly($C_1$-$C_4$ dialkylene siloxane), poly(ethylene-co-propylene), poly(ethylene-co-carbon monoxide), and combinations thereof; said (ii) segments being connected to an (i) polyamide segment through groups selected from amide, ester, urea, carbamate, and imide; provided that the composition contains from about 15 to about 85 weight percent of Component (a) and from about 85 to about 15 weight percent of Component (b). Preferably, Component (b) is provided with greater than 0.02 milliequivalents per gram of acyl lactam groups. It is also preferable that the poly(ε-caprolactam) resin Component (a) has a viscosity average molecular weight of 45,000. More preferably, block polymer Component (b) has from about 35 to about 75 weight percent of Component (ii).

Polyblends which exhibit improved impact resistance over the polyamide resin (a) alone are obtainable by intimately mixing a blend of Components (a) and (b) described above. The compositions of the present invention are particularly useful as engineering thermoplastics.

DETAILED DESCRIPTION OF THE INVENTION

The poly(ε-caprolactam) resin which may be employed in Component (a) of the compositions of the present invention is well known in the art and is commonly referred to as nylon 6. The poly(ε-caprolactam) resin can be produced by the anionically catalyzed polymerization of ε-caprolactam by methods well known in the art. Poly(ε-caprolactam) resin Component (a) of the present invention has a minimum viscosity average molecular weight of at least about 15,000, preferably about 45,000. Reference herein to the molecular weight of the poly(ε-caprolactam) Component (a) means viscosity average molecular weight, $M_v$, which may be determined from the measurement of intrinsic viscosity, $[\eta]$, for the polymer dissolved is m-cresol solution at 25° C., according to the relationship $[\eta] = 1.305 \times 10^{-3} M_v^{0.676}$ as is known to those skilled in the art.

Component (b) in the compositions of the present invention is a block polymer having (i) poly(ε-caprolactam) segments, and (ii) segments of polyol polymer, said block copolymers being more particularly described herein. It has been found that this block polymer can be blended with the poly(ε-caprolactam) resin employed as Component (a) herein to form polyblends with improved impact resistance over the poly(ε-caprolactam) resins alone. As will be illustrated below other similar polyblends, wherein the polyamide or nylon segment (i) of the block polymer (b) is the polyamide resin Component (a) into which the block polymer (b) is blended into, do not exhibit similar improved impact resistance.

More particularly, Component (b) is a block polymer having:

(i) from about 25 to about 80 weight percent poly(ε-caprolactam) segments of the formula

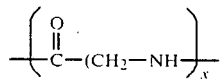

wherein x is an integer equal to 5 or more; and (ii) from about 75 to about 20 weight percent of segments having a number average molecular weight of at least 300 selected from the group consisting of segments of poly(propylene oxide), polycaprolactone, polytetrahydrofuran, polybutadiene, polyisoprene, polyisobutylene, poly($C_1$-$C_8$ alkylene acrylate), poly($C_1$-$C_4$ dialkylene siloxane), poly(ethylene-co-propylene), poly(ethylene-co-carbon monoxide), and combinations thereof; said (ii) segments being connected to an (i) polyamide segment through groups selected from amide, ester, urea, carbamate, and imide.

The (ii) segments in the Component (b) block polymer have a molecular weight of at least 300, preferably 300 to about 10,000. Reference herein to molecular weights of the (ii) segments of Component (b) means number average molecular weight, the determination of which is within the skill of the art. These segments are selected from the group consisting of segments of poly(propylene oxide), polycaprolactone, polytetrahydrofuran, polybutadiene, polyisoprene, polyisobutylene, poly($C_1$-$C_8$ alkylene acrylate), poly($C_1$-$C_4$ dialkylene siloxane), poly(ethylene-co-propylene), poly(ethylene-co-carbon monoxide), and combinations thereof. The carbon atom ranges indicated in the case of the acrylate and siloxane apply to the alkylene groups.

It is to be understood that it is intended that the polymers listed in the aforementioned group encompass comonomeric modifications of such polymers so long as the major portion (i.e., greater than 50% by weight, and preferably greater than 70% by weight) of the polymer is derived from the specific type(s) of monomer(s) indicated. Comonomeric modifications of such polymers are well known in the art and would be within the scope of the present invention provided a corresponding segment is capable of being incorporated in a Component (b) block polymer which can be blended effectively with a Component (a) polyamide. Examples of such comonomeric modifications are poly(ethylene-co-propylene-co-diene monomer), poly(propylene oxide-co-allyl glycidyl ether), poly(butadiene-co-styrene), poly(butadiene-co-acrylonitrile), and poly(butyl acrylate-co-acrylonitrile). The (ii) segments may also be derived from a polymer which is a combination of polymers in the aforementioned group, for example, poly(butadiene-co-isoprene). Those skilled in the art would recognize a wide variety of other such modifications possible to the polymers listed in the aforementioned group.

The (ii) segments may be present in the block polymer in varying chain lengths and may contain branching and/or crosslinking. Also, the block polymer may contain (ii) segments of various types of polymers.

In general, the (ii) segments would be amorphous and elastomeric; that is, these segments would manifest a glass transition temperature below 10° C., preferably below −10° C., in the block polymer and/or the blend of Components (a) and (b). Methods for determination of the glass transition temperature would be within the skill of the art, for example, by dynamic mechanical measurements or differential scanning calorimetry under appropriate conditions for the particular material being analyzed.

Preferred (ii) segments are poly(propylene oxide), polytetrahydrofuran, poly(dimethyl siloxane), and polybutadiene, with poly(propylene oxide) particularly preferred. More preferably, block polymer Component (b) is comprised from about 35 to about 75 weight percent of segments (ii).

The (ii) segments are connected to the polyamide segments through

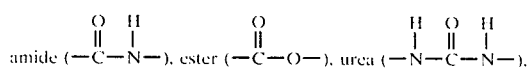

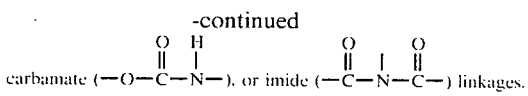

Preferred linking groups are amide, ester, and imide. More preferably, these linking groups are derived from adipoyl bis caprolactam, isophthaloyl bis caprolactam, or terephthaloyl bis caprolactam.

Preferably, the Component (b) block polymers are also provided with acyl lactam groups. It should be noted that the term "acyl lactam" groups as used herein shall include acyl lactam groups having the general formula

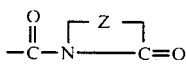

and acyclic species derived therefrom such as imide groups

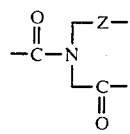

wherein Z is an alkylene group. Preferably Z is an alkylene having from 3 to 14 carbon atoms. The acyl lactam groups are more preferably derived from caprolactam, i.e., wherein Z has 5 carbon atoms. Imide groups and other acyclic species are typically incorporated intralinear into the Component (b) block polymer as a branch point while the acyl lactam groups are typically pendant or terminal to the Component (b) block polymer. Reference herein to amounts of acyl lactam groups means the collective amount of acyl lactam groups and those groups derived therefrom as previously explained. it is believed that these groups react with the amine or possibly even amide groups in the Component (a) poly($\epsilon$-caprolactam) resin to result in adherence between Components (a) and (b) of the compositions of the present invention. It should be noted that this is only a theory and should not in any manner be taken to limit the present invention.

The Component (b) block polymers would typically contain from about 25 to about 80 weight percent of poly($\epsilon$-caprolactam) (i) segments and from about 75 to about 20 weight percent of (ii) segments. In the preferred form Component (b) would be provided with greater than about 0.02 milliequivalents of acyl lactam groups per gram of block polymer. Effective impact enhancement would generally result with (ii) segments comprising from about 3 to about 65 percent by weight of the total of Components (a) and (b) of the compositions of the present invention. More preferable, segments (ii) would comprise from about 10 to about 30 weight percent of the total of Components (a) and (b). Impact enhancement herein means that the composition of the present invention comprising Components (a) and (b) gives higher impact resistance than the polyamide Component (a) alone. Improved impact resistance would be shown in the notched Izod Impact Test ASTM D-256-56A and/or the Gardner Multiaxial Test described hereinafter. Impact results can generally be increased from about two-fold to five-fold, or greater.

It is to be understood that the inclusion of other segments in the Component (b) block copolymers is possible so long as the presence thereof does not prevent the block polymer from being effectively compatible when blended with the poly($\epsilon$-caprolactam) Component (a). It should also be understood that the block copolymers may contain substantial branching and/or crosslinking.

The preferred form of the block copolymer employed as Component (b) in the present invention may be prepared by methods known in the art. For example, U.S. Pat. No. 3,862,262, issued Jan. 21, 1975 and U.S. Pat. No. 4,031,164, issued June 21, 1977, both to R. M. Hedrick et al describe lactam-polyol-acyl polylactam polymers which may be employed as Component (b). These patents are herein incorporated by reference.

As described in the Hedrick et al patents, lactam-polyol-acyl polylactam polymers are prepared by reacting together a lactam monomer, a polyol, and an acyl polylactam in the presence of a base catalyst for the anhydrous polymerization of a lactam. The lactam monomer which forms the polymerized lactam component of the polymer can be selected from cyclic monomeric lactams of the formula:

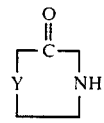

where Y is an alkylene group having at least about 3 carbon atoms, preferably from about 3 to 12 or 14 and more, more preferably from about 5 to about 11 carbon atoms. A monomer disclosed as preferred is $\epsilon$-caprolactam.

During polymerization the cyclic lactam ring is opened to provide the following monomeric unit residue

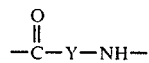

which, together with other lactam molecules, produces a polymeric block of the formula

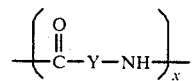

where x and Y can be as previously defined herein.

Polymerized polyol segments in the Hedrick et al polymers are formed from polyol components having at least two hydroxy groups. A large number of suitable polymeric polyols such as poly(propylene oxide) diol and polytetrahydrofuran diol are disclosed. Commercially available polymeric polyols typically have molecular weights from 200 to 5,000.

The acyl polylactam component in the Hedrick et al reaction mixture forms a linkage between the polymerized polyol segments and the lactam polymer segments. Exemplary acyl polylactams including terephthaloyl bis-caprolactam, i.e.,

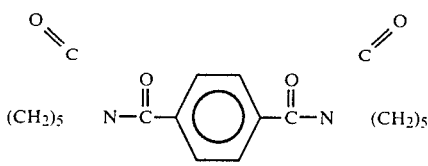

adipoyl bis-caprolactam, malonyl bis-pyrrolidinone; succinoyl bis-pyrrolidinone,; glutaroyl bis-piperidone; glutaconoyl bis-piperidone; 2-ethyl-2-phenyl-glutaroyl bis-valerolactam; 2,3-diethylsuccinoyl bis-caprolactam; pimeloyl bis-capryllactam; sebacoyl bis-caprolactam; phthaloyl bis-piperidone; isophthaloyl bis-dodecanolactam; trimesoyltris-caprolactam; (1,3,5-benzene tricarbonyltris-caprolactam); 1,2,3,5-benzenetetracarbonyl tetrakiscaprolactam; 1,2,3,4-naphthalenetetracarbonyltetrakispiperidone; and 1,4-cyclohexanedicarbonyl biscaprolactam.

Polymerization temperatures for preparing the Hedrick et al polymers can vary from the melting point of the lactam or less up to the melting point of the resultant polymer or more. Depending upon the particular ingredients being used, this can encompass a range from 70° to 230° C. or more. Preferred polymerization temperatures are from about 90° to about 190° C., and more preferably from about 120° to about 180° C. for caprolactam polymers. Even more preferred is a polymerization where the temperature is increased during the polymerization from an initial temperature of from about 70° to about 100° C. at the beginning of the polymerization to a final temperature of about 150° to 180° C. Such a technique produces a rapid polymerization of a polymer having high strength and modulus.

Times required for complete polymerization will vary considerably depending upon polymerization temperatures and the specific ingredients used in the polymerization system. Total polymerization time can be as little as 30 seconds or less, preferably from 1 to 10 minutes, and can be extended to any duration up to several days or more. Generally, polymerization times of from 1 to 10 minutes are preferred for most polymerization systems.

The lactam polymerization catalyst disclosed as useful by Hedrick et al includes that class of compounds commonly recognized as suitable basic catalysts for the anionic polymerization of lactams. In general, all alkali or alkaline earth metals are effective catalysts either in the metallic form or in the form of hydrides, halohydrides, alkylhalides, oxides, hydroxides, carbonates, and the like. Also useful are a number of organometallic compounds of the metals mentioned above such as metal alkyls, metal phenyls, metal amides, and the like. Examples include sodium hydride, potassium hydroxide, lithium oxide, ethyl magnesium bromide, calcium fluorohydride, strontium carbonate, barium hydroxide, methyl sodium, butyl lithium, potassium phenyl, diphenyl barium, sodium amide, and magnesium diethyl. All of the foregoing compounds react with the lactam monomer to form the metal lactam, which is the active catalytic agent in the lactam polymerization mechanism. The metal lactam catalyst can therefore be formed in situ by reaction of one of the foregoing metal or metal compounds with lactam monomer in the polymerization medium or by prior reaction of the metal or metal compound with a stoichiometric quantity of lactam monomer. Examples of metal lactam catalysts include sodium caprolactam, magnesium caprolactam, bromomagnesium pyrrolidinone, chlorocalcium caprolactam, and the like. Catalyst concentrations can range from a fraction of one mole percent to 15 or 20 or more mole percent of the lactam monomer to be polymerized.

The compositions of the present invention contain from about 25 to about 80 weight percent of Component (a) and from about 75 to about 20 weight percent of Component (b), said weight percents being of the total weight of the composition. Other ingredients may be included in the compositions of the present invention. Such ingredients may be introduced with Component (a) or (b), introduced as a separate component blended with Components (a) and (b), introduced as a separate component after (a) and (b) are blended, or otherwise, so long as such ingredients do not interfere with the compatibility between (a) and (b). Typical ingredients which might be desirable in a composition of the present invention for use as a molding resin include stabilizers and inhibitors of oxidative, thermal, and ultraviolet light degradation; lubricants and mold release agents, colorants, fillers and reinforcing agents, nucleating agents, plasticizers, flame retardant agents, etc. Generally such additives will comprise less than 45 percent by weight of a composition within the present invention.

The compositions of the present invention may be a simple mixture of Components (a) and (b) or a more intimate blend of the components. Various conventional means may be employed to provide a substantially uniform mixture of Components (a) and (b). More intimate mixing can be achieved by melt blending, that is, by intensive mixing or blending of the materials in molten states under a high shear rate. Conventional means well known to those skilled in the art for intimately mixing plastics may be employed, for example, reciprocating screw injection molding, single or twin screw extrusion, and roll milling.

The following Examples are provided to illustrate the present invention and are not to be construed as limiting in any way. Unless otherwise indicated, parts and percentages are expressed in terms of weight.

A. PREPARATION OF BLOCK POLYMER

EXAMPLES 1-6

Examples 1 through 6 illustrate the preparation of block polymers useful in the practice of the present invention. These block polymers were prepared from caprolactam and poly(propylene oxide) diol with the percent by weight of the poly(propylene oxide) diol varying between 20 and 55 percent of the final block polymer. Polyol solutions used in the preparation of Examples 1 through 6 were prepared by melting and mixing together the poly(propylene oxide)diol, caprolactam, and FLECTOL®H (an antioxidant) and then removing by vacuum distillation 100 parts by weight of the caprolactam prior to adding isophthaloyl bis-caprolactam and decyl alcohol. The amount of ingredients used to prepare each Example is shown below in parts by weight in Table I. This polyol solution was maintained at 90° C.

TABLE I

| PREPARATIONS OF BLOCK COPOLYMERS | | | | | | |
|---|---|---|---|---|---|---|
| COMPONENTS | Example 1 | Example 2 | Example 3 | Example 4 | Example 5 | Example 6 |
| VORANOL ® | 1575 | 8575 | 7348 | 9979 | 1050 | 6350 |

TABLE I-continued
PREPARATIONS OF BLOCK COPOLYMERS

| COMPONENTS | Example 1 | Example 2 | Example 3 | Example 4 | Example 5 | Example 6 |
|---|---|---|---|---|---|---|
| 2000$^a$ | | | | | | |
| Caprolactam$^b$ | 1350 | 6903 | 5966 | 4444 | 2020 | 8686 |
| Isophthaloyl-bis-caprolactam | 334.5 | 1817 | 1533 | 1852 | 259 | 1218 |
| Catalyst Solution | 326 | 1644 | 1819 | 1897 | 239 | 1917 |
| FLECTOL ® H$^c$ | 17.5 | 95 | 82 | 91 | 17.5 | 91 |
| Decyl Alcohol | 14.9 | 217 | 134 | 72 | 32.4 | 72 |

$^a$An essentially linear poly(propylene oxide) diol, sold by Dow Chemical Co., having molecular weight of about 2,000.
$^b$Initial charge, including 100 parts by weight removed via vacuum distillation before reaction, but excluding caprolactam solvent in catalyst solution.
$^c$Antioxidant sold by Monsanto Co., polymerized 1,2-dihydro-2,2,4-trimethylquinoline.

The polyol solutions were then mixed with a catalyst solution which was a 0.4 molar solution of bromomagnesium caprolactam dissolved in caprolactam also maintained at 90° C. These two solutions were admixed by pumping the two solutions through a ¼-inch Kenics static mixer into a planar, vertical, ½-inch thick steel mold cavity. The mold was initially heated to about 130° C. The relative flow rate of the two solutions was constant and in direct proportion to the initial amounts of the two solutions. After the mold was filled, it was heated up to approximately 160° C. over a period of fifteen minutes and then held at 160° C. for 30 minutes. Then the mold was cooled to approximately 70° C. within approximately 15 minutes. The resulting solid block polymers were removed and ground into chips or flakes of roughly ¼-inch by 1/16-inch by 1/32-inch. These chips were then processed through an extruder and chopped into pellets of approximately ⅛-inch diameter by ⅛-inch in length.

EXAMPLE 7

Example 7 illustrates another method of preparing a block polymer for use in accordance with the present invention. This method involved first preparing a lactam-capped polyether which was then reacted with caprolactam in the presence of a catalyst.

The preparation of the lactam-capped polyether involved preparing a solution of 31.3 grams (0.31 moles) of triethylamine in 50 milliliters of tetrahydrofuran which was then added to a solution comprising 500 grams (0.103 moles) of an ethylene oxide-capped poly(propylene oxide)triol and 52.3 grams (0.258 moles) of terephthaloyl chloride in 300 milliliters of tetrahydrofuran. The temperature of the solution rose from about 22° C. to about 45° C. and a white precipitate of amine hydrochloride precipitated out of the solution. The mixture was stirred over 3 hours and then a solution of 20.8 grams (0.206 mole) of triethylamine and 23.5 grams (0.208 mole) of caprolactam in 30 milliliters of tetrahydrofuran was added over a seven minute period. The temperature rose from about 27° C. to about 33° C. The reaction was then heated to reflux at approximately 76° C. and maintained at this temperature for about one hour. The mixture was then allowed to cool and 100 milliliters of tetrahydrofuran were added. The mixture was then filtered and washed twice with about 75 milliliters of tetrahydrofuran.

The tetrahydrofuran was removed at 80° C. under vacuum over 3 hours leaving about 550 grams of a hazy yellow syrup. An infrared spectrum of this resulting polymer shows no hydroxyl absorption but a strong ester carbonyl band and a weaker amide carbonyl absorption band, thus demonstrating the formation of the lactam-capped polyether.

The block polymer was then prepared by mixing 67 grams of the lactam-capped polyether prepared above with 108 grams of caprolactam and 1.5 grams of FLECTOL ®H. This mixture was melted and stirred and 25 grams of caprolactam removed via vacuum distillation. The mixture was cooled and held at 85° C.

A catalyst solution was prepared by first melting 225 grams of caprolactam and drying by vacuum distilling 75 grams of caprolactam prior to adding 15.5 milliliters of a 3 molar solution of ethyl magnesium bromide in ethyl ether under nitrogen gas purge, thus eliminating the ethyl ether from the solution. The temperature of the solution was increased to 100° C. This mixture was then degassed under vacuum for about 1 hour and held at 100° C.

The catalyst solution and the lactam-capped polyether solution were pumped through a ¼-inch Kenics static mixer into a planar, vertical ⅛-inch thick steel mold cavity. Relative flow rates were constant in direct proportion to the initial amount of the (i) and (ii) segments in prepared Component (b) block polymers. The mold was preheated to about 130° C. The exothermic reaction caused by mixing the two solutions increased the temperature of the mold to approximately 150° to 175° C. in about 1-2 minutes. The mold was then allowed to cool to about 70° C. before removing the solid block polymer. The resulting polymer was then ground into chips.

With reference to Table II below, Examples 1-7 of the block polymers prepared above are listed showing the weight percent of polyol segments, approximately polyol molecular weight, and approximate milliequivalents of acyl lactam functionality per gram of block polymer formed.

TABLE II
BLOCK COPOLYMER CHARACTERISTICS

| | Polymer Segments Content, Weight % In Block Copolymer | Approximate Molecular Weight Of Polyol Segments | Approximate Milliequivalents Functionality Per Gram Of Block Copolymer |
|---|---|---|---|
| Example 1 | 45 | 1976$^a$ | 0.054$_5^c$ |
| Example 2 | 45 | 1976$^a$ | 0.0081$_5^c$ |
| Example 3 | 44 | 2011$^a$ | 0.027$^c$ |
| Example 4 | 55 | 2036$^a$ | 0.0081$^c$ |
| Example 5 | 30 | 1976$^a$ | 0.053$^c$ |
| Example 6 | 35 | 2036$^a$ | 0.008$^c$ |
| Example 7 | 20 | 1616$^b$ | 0.083$^d$ |

$^a$Essentially linear.
$^b$Essentially three equal molecular weight segments, one end of each bonded to a single branch point.
$^c$Milliequivalents of acyl lactam groups and imide residues thereof per gram of block polymer, determined in these Examples as follows:
2.000 [(grams of isophthaloyl-bis-caprolactam ÷ 356)-(grams of polypropylene oxide diol ÷ molecular weight of polypropylene oxide diol)-(grams of decyl alcohol ÷ 316)] ÷ [grams of polypropylene oxide diol + grams of isophthaloyl-bis-caprolactam + grams of caprolactam* + grams of decyl alcohol + grams of catalyst solution].
*Initial charge (Table 1) minus amount (100 parts by weight in the Examples in Table 1) removed via vacuum distillation prior to reaction.
$^d$0.370 milliequivalents acyl lactam functionality per gram of prepolymer × 67 grams of prepolymer ÷ 300 grams of block polymer = 0.083 milliequivalents acyl lactam functionality per gram of block polymer.

B. PREPARATION OF POLYMER BLEND

EXAMPLES 8–47

Examples 8–47 illustrate blends of nylon 6 resins with the block polymers of Examples 1–7 prepared above.

The nylon resins were of three types indicated below in Table III and were in the form of pellets roughly ⅛-inch diameter by ⅛-inch long. Both the nylon and the block polymer pellets were thoroughly predried under slow dry-nitrogen bleed in a vacuum oven at approximately 60°–75° C. for at least eight hours.

TABLE III

NYLON 6 RESIN COMPOSITIONS

| | | |
|---|---|---|
| A—PLASKON ® 8205, | Nylon 6 having a molecular weight of about 70,000[a] | |
| B—PLASKON ® 8200, | Nylon 6 having a molecular weight of about 34,000[a] | |
| C—NYLARSAR ® J3/30 | Nylon 6 with 30 weight chopped fiberglass with the molecular weight of the Nylon 6 greater than about 20,000[b] | |

[a]Sold by Allied Chemical Co.
[b]Sold by Nylafil Co.

The nylon resin pellets and the block polymer pellets of Examples 1–7 were dry blended in the weight percent as indicated in Table IV below. The resulting dry blends were then melted and injection molded into test specimens using a Newbury 3-ounce reciprocating screw injection molding machine. The injection molding barrel temperatures were maintained in a range of approximately 480° to 520° C.

Examples 8–47 were formed into various test specimens for undergoing the test listed below. These test specimens were large tensile bars, short and long gauge tensile impact bars, three discs for Gardner impact testing, and a bar for flexural, Izod, or heat-distortion temperature tests.

Examples 8–47 were subjected to the following tests with the results reported in Table IV, below.

Izod Impact Strength—ASTM D256 0.0254±0.00254 cm radius notch (Method A). Specimens were 1.27 cm deep×0.635 cm wide rectangular cross-section, 12.7 cm long, injection molded bars. Reported results are representative of impact strength in the center of 6.35 cm long bars cut from the centers of 12.3 cm long injection molded bars. Units are in N-m/m.

Gardner Impact Strength—Gardner Reverse Impact Tester, Model IG-1120, using injection molded, circular 5.08 cm diameter×0.3125 cm thick disc specimens. Dart with polished hemispherical tip of 1.59 cm diameter was used, each specimen was impacted downward only once, with a 0.908 or 1.82 kg hammer. Drop height (cm) was varied from one specimen to another, until failure, determined by break or crack in specimen, was achieved or avoided. The product of the hammer weight times hammer drop height represents an impact in N-m. The results reported represent the maximum impact energy at which more than half of a number of specimens tested pass without failure. A representative number of specimens to test is 12–16.

Tensile Strength—ASTM D638-68 using 0.318 cm thick Type I tensile bars with 5.08 cm gauge length and 0.508 cm per minute cross-head speed. Results are in $10^6 N/m^2$.

Flexural Modulus—ASTM D790-66 using crosshead speed of 1.27 cm/min. Specimens were injection molded bars 0.635 cm wide×1.27 cm deep×12.7 cm long. Results are in $10^6 N/m^2$.

Heat-Distortion Temperatures—ASTM D648-56 (Deflection Temperature of Plastics Under Load) using fiber stress of 17.87 kg/cm². Specimens were injection molded bars 0.635 cm wide×1.27 cm deep×12.7 cm long.

TABLE IV

NYLON 6 RESIN COMPOSITIONS WITH AND WITHOUT BLOCK POLYMERS

| Example | Nylon Resin (Table III)- Weight %[a] | Block Polymer (Table II)- Weight %[a] | Polyol Segments Content, Weight %[b] | Fiberglass Content, Weight %[a] | Impact Strength Izod, N-m/m | Impact Strength Gardner, N-m | Flexural Modulus, $10^6 N/m^2$ | Tensile Strength, $10^6 N/m^2$ | Heat Distortion Temp., °C. |
|---|---|---|---|---|---|---|---|---|---|
| 8 | A-100 | None-0 | 0 | 0 | 30.76 | — | 2550 | 76 | 60 |
| 9 | B-100 | None-0 | 0 | 0 | 20.40 | — | 2600 | — | 56 |
| 10 | A-77.5 | Ex. 5-22.5 | 6.75 | 0 | 200 | — | — | — | — |
| 11 | B-77.5 | Ex. 5-22.5 | 6.75 | 0 | 140 | — | — | — | — |
| 12 | A-80.7 | Ex. 6-19.3 | 6.75 | 0 | 160 | — | — | — | — |
| 13 | B-80.7 | Ex. 6-19.3 | 6.75 | 0 | 120 | — | — | — | — |
| 14 | A-84.7 | Ex. 3-15.3 | 6.75 | 0 | 240 | — | 2190 | — | — |
| 15 | B-84.7 | Ex. 3-15.3 | 6.75 | 0 | 140 | — | — | — | — |
| 16 | A-85 | Ex. 2-15 | 6.75 | 0 | 544 | — | 2200 | 61 | 52 |
| 17 | B-85 | Ex. 2-15 | 6.75 | 0 | 250 | — | 2000 | 61 | 56 |
| 18 | A-62.5 | Ex. 7-37.5 | 7.5 | 0 | 250 | — | — | — | — |
| 19 | B-62.5 | Ex. 7-37.5 | 7.5 | 0 | 120 | — | — | — | — |
| 20 | A-82 | Ex. 1-18 | 8.1 | 0 | 544 | — | 2100 | — | 55 |
| 21 | B-83.5 | Ex. 4-16.4 | 9.0 | 0 | 180 | — | 1900 | 59 | 55 |
| 22 | A-75.5 | Ex. 3-24.5 | 10.8 | 0 | 240,340 | — | 1710–1720 | 50 | 58 |
| 23 | B-75.5 | Ex. 3-24.5 | 10.8 | 0 | 180 | — | — | — | — |
| 24 | A-76 | Ex. 2-24 | 10.8 | 0 | 260 | — | 1940 | — | — |
| 25 | B-76 | Ex. 2-24 | 10.8 | 0 | 150 | — | 1790 | 55 | 55 |
| 26 | A-40 | Ex. 7-60 | 12 | 0 | 230 | — | — | — | — |
| 27 | B-40 | Ex. 7-60 | 12 | 0 | 280 | — | — | — | — |
| 28 | A-55 | Ex. 5-45 | 13.5 | 0 | 220 | — | — | — | — |
| 29 | B-55 | Ex. 5-45 | 13.5 | 0 | 210 | — | — | — | — |
| 30 | A-61.4 | Ex. 6-38.6 | 13.5 | 0 | 190 | — | — | — | — |
| 31 | B-61.4 | Ex. 6-38.6 | 13.5 | 0 | 170 | — | — | — | — |
| 32 | A-69.3 | Ex. 3-30.7 | 13.5 | 0 | 590 | — | 1520 | — | 55 |
| 33 | B-69.3 | Ex. 3-30.7 | 13.5 | 0 | 190 | — | — | — | — |
| 34 | A-70 | Ex. 2-30 | 13.5 | 0 | 290 | — | — | — | — |
| 35 | B-70 | Ex. 2-30 | 13.5 | 0 | 170 | — | 1520 | 50 | 54 |
| 36 | A-59.1 | Ex. 3-40.9 | 18 | 0 | 520,820 | — | 1310 | 42 | 53 |
| 37 | B-59.1 | Ex. 3-40.9 | 18 | 0 | 200 | — | — | — | — |

TABLE IV-continued
NYLON 6 RESIN COMPOSITIONS WITH AND WITHOUT BLOCK POLYMERS

| Example | Nylon Resin (Table III)- Weight %[a] | Block Polymer (Table II)- Weight %[a] | Polyol Segments Content, Weight %[b] | Fiber-glass Content, Weight %[a] | Impact Strength Izod. N-m/m | Impact Strength Gardner, N-m | Flexural Modulus, $10^6 N/m^2$ | Tensile Strength, $10^6 N/m^2$ | Heat Distortion Temp., °C. |
|---|---|---|---|---|---|---|---|---|---|
| 38 | A-60 | Ex. 2-40 | 18 | 0 | 290 | — | 1360 | 46 | 54 |
| 39 | B-60 | Ex. 2-40 | 18 | 0 | 160 | — | — | — | — |
| 40 | A-38.6 | Ex. 3-61.4 | 27 | 0 | 650,630 | — | 660,530 | — | 46 |
| 41 | B-38.6 | Ex. 3-61.4 | 27 | 0 | 870 | — | 1190 | 34 | 52 |
| 42 | A-40 | Ex. 2-60 | 27 | 0 | 650 | — | — | — | — |
| 43 | B-40 | Ex. 2-60 | 27 | 0 | 948 | — | 1240 | 34 | 51 |
| 44 | A/C-90/10 | None-0 | 0 | 3.0 | 43 | 10 | 2860 | — | 63 |
| 45 | A/C-72.5/10 | Ex. 1-17.5 | 8.1 | 3.0 | 130 | >18 | 2420 | — | 59 |
| 46 | A/C-80/20 | None-0 | 0 | 6.0 | 30 | 9 | 3480 | — | 132 |
| 47 | A/C-57/20 | Ex. 3-23 | 10.8 | 6.0 | 150 | >18 | 2650 | 677 | — |

[a]Weight % of total composition.
[b]Weight % of organic polymer components.

As is illustrated in Table IV above, polymer blends of Components (a) and (b) in accordance with the present invention (Examples 10-43) demonstrate improved impact strength as indicated by Izod impact over straight nylon 6 compositions (Examples 8 and 9). Examples 45 and 47 which are glass reinforced blends in accordance with the present invention exhibit improved impact strength as seen from the Izod impact and Gardner impact strength results when compared to glass reinforced straight nylon compositions, Examples 44 and 46.

As stated above similar polyblends wherein the polyamide segment (i) is the same as the polyamide resin Component (a) do not exhibit improved impact properties over the polyamide resin alone. The following Examples illustrate this point by examining similar type polyblends to those of the present invention prepared from nylon 6,6 and block polymers containing nylon 6,6 segments.

C. PREPARATION OF NYLON 6,6 CONTAINING BLOCK COPOLYMERS

EXAMPLES 48 AND 49

Examples 48 and 49 were prepared from nylon 6,6 and an elastomer-type polyol, polycaprolactone and polytetrahydrofuran, respectively. The amounts of the ingredients used to prepare each of Examples 48 and 49 are shown below in parts by weight in Table V.

The polyol was melt blended with isophthaloyl bis caprolactam in vacuo under nitrogen gas at about 135°-150° C. in a glass three-necked flask which was fitted with a heating mantle, thermocouple, a stirrer driven by a high-torque DC motor, a nitrogen gas inlet and an outlet connected first to a dry-ice trap and then to an atmospheric vent or to a vacuum pump. Under nitrogen gas purge at atmospheric pressure, one-half of a prepared catalyst solution, bromomagnesium caprolactam in chlorobenzene at 12 weight % of the chlorobenzene, was added and the mixture was stirred at about 145°-150° C. for about 10 minutes. The viscosity of the mixture increased. Then another one-quarter of the catalyst solution was added, and the mixture was stirred at about 145°-150° C. for about 20 minutes more. The viscosity continued to increase. The last one-quarter of the catalyst solution was added and the mixture was stirred at about 145°-150° C. for about an additional 10 minutes. The nitrogen gas was turned off and the outlet from the trap was connected to a vacuum pump. The stirring was continued under high vacuum for about 30 minutes. About 115-120 parts by weight of chlorobenzene and caprolactam were removed from the mixture.

The nylon 6,6 used to prepare the block polymers of Examples 48 and 49 were terminated with amine groups by methods well known in the art.

The nylon 6,6 diamine and one-tenth of a stabilizer mixture, cupric acetate hydrate and potassium iodide in a 1 to 10 parts by weight ratio, were dissolved in the tetramethylene sulfone at about 160° C. and added with stirring to the acyl lactam-capped polyol prepared as described above. Stirring was continued as the temperature was increased to about 230° C. over a period of about 30 minutes, whereupon the mixture became homogeneous and the viscosity increased markedly. Stirring at 230° C. was continued for about an additional 90 minutes. The stirring was stopped, and the reaction was cooled to yield a solid, brown mass in the flask. The glass flask was broken and separated from the solid reaction product. The polymer mass was cut up into small chips and washed in a Waring blender several times with 50 percent aqueous acetone. The product was soaked in a large excess of 50 percent aqueous acetone for 24 hours. The product was then filtered and soaked in an excess of aqueous acetone again for 24 hours and filtered. This soaking and filtering was repeated several times. The polymer was air-dried and thoroughly dried in vacuo. The dried polymer was mixed with the remaining 90 percent of the stabilizer mixture which had been mixed with 80 parts by weight of tetrahydrofuran and 80 parts by weight of methanol. This mixture was stored in a capped bottle for several days. The polymer product was then dried in vacuo under nitrogen purge for several days. The weight of the dried polymer product was determined as indicated in Table V.

The dry block copolymer product prepared in Example 48 had a melt index of 0.12 dg/min. @280° C. and, after compression molding at about 270° C., the tensile strength at break at 730 F. was 242 kg/cm², the tensile elongation at break at 73° F. was 183 percent, and the Shore hardness was D55.

The dry block copolymer product prepared in Example 49 was a hard, rubbery solid. Its melt viscosity and other physical properties were not determined.

TABLE V
PREPARATIONS OF NYLON 66 BLOCK COPOLYMERS

| Components | Example 48 | Example 49 |
|---|---|---|
| Polyol | 500[a] | 600[b] |
| Isophthaloyl bis caprolactam | 142 | 183 |
| Catalyst Solution | 130 | 130 |

TABLE V-continued

PREPARATIONS OF NYLON 66 BLOCK COPOLYMERS

| Components | Example 48 | Example 49 |
|---|---|---|
| Nylon 66 Diamine | 500[c] | 400[d] |
| Tetramethylene sulfone | 1500 | 1200 |
| Stabilizer | 4.4 | 4.4 |
| Weight of dried polymer product | 1060 | 1070 |

[a]Polycaprolactone diol, Niax CPO Diol 0240, number-average molecular weight about 2000, sold by Union Carbide Corporation.
[b]Polytetrahydrofuran diol, Polymeg 2000, number-average molecular weight about 2000, sold by Quaker Oats Co.
[c]Nylon 66 diamine, number-average molecular weight 3400, 0.584 milliequivalents of amine end groups per gram, plus 0.004 milliequivalents of carboxylic acid end groups per gram.
[d]Nylon 66 diamine, number-average molecular weight of 1842, 108 milliequivalents of amine end groups per gram, plus 0.006 milliequivalents of carboxylic acid end groups per gram.

D. PREPARATIONS OF POLYMER BLENDS

Examples 50–52 illustrate blends of a nylon 6,6 resin with and without the block polymers of Examples 48 and 49 prepared above. The nylon 6,6 resin used is a very high molecular weight (weight-average molecular weight of about 80,000), extrusion-grade nylon 6,6 resin, VYDYNE ®66B, sold by Monsanto Company. The nylon 6,6 resin pellets and the nylon 6,6 block copolymer chips of Examples 48 and 49 were dry blended in the weight percentages as indicated in Table VI below. The resulting dry blends were thoroughly dried in vacuo under nitrogen purge for about eight hours and then melted and injection molded in a Newbury 93 g reciprocating-screw injection molding machine the same as the blends of nylon 6 block copolymers of Examples 8–47 except the injection molding barrel temperatures were in a range of approximately 280°–285° C. Molded test specimens were tested for Izod impact strength the same as performed for Examples 8–47 with the results indicated in Table VI below.

TABLE VI

NYLON 6,6 RESIN COMPOSTIONS WITH AND WITHOUT NYLON 6,6 BLOCK POLYMERS

| Example | Nylon 6,6 Resin, Weight % | Nylon 6,6 Block Polymer (Table V)- Weight % | Approximate Polyol Segments Content Weight % | Izod Impact Strength, N—m/m |
|---|---|---|---|---|
| 50 | 100 | None-0 | 0 | 64 |
| 51 | 46 | Ex. 48-54 | 27 | 40 40* |
| 52 | 55 | Ex. 49-45 | 27 | 10 10* |

*Result after injection-molded specimens were ground, redried, remolded and tested.

As seen from Examples 51 & 52 above, polymer blends of high-molecular-weight nylon 6,6 and nylon 6,6 block copolymers do not exhibit improved Izod impact strength over straight nylon 6,6 of Example 50.

While the preferred embodiments of the present invention have been described and illustrated, numerous variations and modifications can be made thereto without departing from the spirit and scope of the invention. Accordingly, it is to be understood that the present invention has been described by way of illustration and not limitation.

What is claimed is:

1. A composition comprising:
   (a) poly(ε-caprolactam) resin of viscosity average molecular weight of at least about 15,000; and
   (b) at least one block polymer having
   (i) from about 25 to about 80 weight percent poly(ε-caprolactam) segments of the formula:

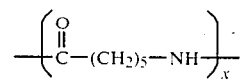

wherein x is an integer equal to 5 or more; and
   (ii) from about 75 to about 20 weight percent of segments having a number average molecular weight of at least 300 selected from the group consisting of segments of poly(propylene oxide), polycaprolactone, polytetrahydrofuran, polybutadiene, polyisoprene, polyisobutylene, poly($C_1$–$C_8$ alkylene acrylate), poly($C_1$–$C_4$ dialkylene siloxane), poly(ethylene-co-propylene), poly(ethylene-co-carbon monoxide), and combinations thereof; said (ii) segments being connected to an (i) polyamide segment through groups selected from amide, ester, urea, carbamate, and imides;

provided that the composition contains from about 15 to about 85 weight percent of Component (a) and from about 85 to about 15 weight percent of Component (b).

2. The composition of claim 1 wherein the (ii) segments of the block polymer are selected from poly(propylene oxide), polytetrahydrofuran, polybutadiene, and poly(dimethyl siloxane).

3. The composition of claim 1 wherein the (ii) segments are connected to the (i) poly(ε-caprolactam) segments through groups selected from amide, ester, and imide.

4. The composition of claim 3 wherein said groups selected from amide, ester, and imide are derived from adipoyl-bis-caprolactam, isophthaloyl-bis-caprolactam, or terephthaloyl-bis-caprolactam.

5. The composition of claim 1 wherein Component (a) said poly(ε-caprolactam) resin has a viscosity average molecular weight of at least about 45,000.

6. The composition of claim 1 wherein Component (b) is further provided with acyl lactam groups having the general structure

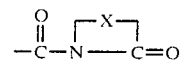

or acyclic derivatives thereof wherein X is an alkylene group.

7. The composition of claim 2 wherein Component (b) is further provided with acyl lactam groups having the general formula (

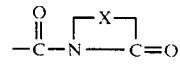

or acyclic derivatives thereof wherein X is an alkylene group.

8. The composition of claim 3 wherein Component (b) is further provided with acyl lactam groups having the general structure

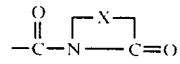

or acyclic derivatives thereof wherein X is an alkylene group.

9. The composition of claim 4 wherein Component (b) is further provided with acyl lactam groups having the general structure

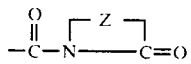

or acyclic derivatives thereof wherein X is an alkylene group.

10. The composition of claim 5 wherein Component (b) is further provided with acyl lactam groups having the general structure

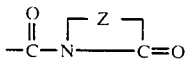

or acyclic derivatives thereof wherein X is an alkylene group.

11. The composition of claim 6 wherein said acyl lactam groups are provided in an amount greater than about 0.02 milliequivalents per gram of Component (b).

12. The composition of claim 7 wherein said acyl lactam groups are provided in an amount greater than about 0.02 milliequivalents per gram of Component (b).

13. The composition of claim 8 wherein said acyl lactam groups are provided in an amount greater than about 0.02 milliequivalents per gram of Component (b).

14. The composition of claim 9 wherein said acyl lactam groups are provided in an amount greater than about 0.02 milliequivalents per gram of Component (b).

15. The composition of claim 10 wherein said acyl lactam groups are provided in an amount greater than about 0.02 milliequivalents per gram of Component (b).

16. The composition of claim 11 wherein said acyl lactam groups are derived from caprolactam.

17. The composition of claim 12 wherein said acyl lactam groups are derived from caprolactam.

18. The composition of claim 13 wherein said acyl lactam groups are derived from caprolactam.

19. The composition of claim 14 wherein said acyl lactam groups are derived from caprolactam.

20. The composition of claim 15 wherein said acyl lactam groups are derived from caprolactam.

21. The composition of claim 11 wherein said alkylene group of said acyl lactam has from about 3 to about 14 carbon atoms.

22. The composition of claim 12 wherein said alkylene group of said acyl lactam has from about 3 to about 14 carbon atoms.

23. The composition of claim 13 wherein said alkylene group of said acyl lactam has from about 3 to about 14 carbon atoms.

24. The composition of claim 14 wherein said alkylene group of said acyl lactam has from about 3 to about 14 carbon atoms.

25. The composition of claim 15 wherein said alkylene group of said acyl lactam has from about 3 to about 14 carbon atoms.

26. The composition of claim 1 wherein said (ii) segments comprise from about 3 to about 65 percent by weight of the total of Components (a) and (b).

27. The composition of claim 6 wherein said (ii) segments comprise from about 3 to about 65 percent by weight of the total of Components (a) and (b).

28. The composition of claim 11 wherein said (ii) segments comprise from about 3 to about 65 percent by weight of the total of Components (a) and (b).

29. The composition of claim 16 wherein said (ii) segments comprise from about 3 to about 65 percent by weight of the total of Components (a) and (b).

30. The composition of claim 21 wherein said (ii) segments comprise from about 3 to about 65 percent by weight of the total of Components (a) and (b).

31. The composition of claim 26 wherein said (ii) segments comprise from about 10 to about 30 percent by weight of the total of Components (a) and (b).

32. The composition of claim 27 wherein said (ii) segments comprise from about 10 to about 30 percent by weight of the total of Components (a) and (b).

33. The composition of claim 28 wherein said (ii) segments comprise from about 10 to about 30 percent by weight of the total of Components (a) and (b).

34. The composition of claim 29 wherein said (ii) segments comprise from about 10 to about 30 percent by weight of the total of Components (a) and (b).

35. The composition of claim 30 wherein said (ii) segments comprise from about 10 to about 30 percent by weight of the total of Components (a) and (b).

* * * * *